United States Patent [19]

Pernick

[11] Patent Number: 4,544,898

[45] Date of Patent: Oct. 1, 1985

[54] SIGNAL DEVICE EMPLOYING PHOTOREFRACTIVE AREA MODULATION

[75] Inventor: Benjamin J. Pernick, Hampton Bays, N.Y.

[73] Assignee: Grumman Aerospace Corporation, Bethpage, N.Y.

[21] Appl. No.: 492,660

[22] Filed: May 9, 1983

[51] Int. Cl.[4] .................. H01S 3/00; G02B 5/23; G02F 1/01
[52] U.S. Cl. .................................... 332/7.51; 350/354
[58] Field of Search ............... 332/7.51; 350/354, 380, 350/342, 392; 455/609, 611, 617 F; 358/232, 236; 333/157; 356/237, 359; 343/9 PS

[56] References Cited

U.S. PATENT DOCUMENTS

| | | |
|---|---|---|
| 3,454,414 | 11/1964 | Andes et al. .................... 350/354 |
| 3,535,021 | 5/1968 | Amodei ........................... 350/354 |
| 3,940,201 | 2/1976 | Micheron et al. ............... 350/392 |
| 4,166,254 | 8/1979 | Bjorklund ....................... 350/354 |
| 4,216,474 | 8/1980 | Levine ............................. 343/9 PS |

*Primary Examiner*—S. C. Buczinski
*Assistant Examiner*—Linda J. Wallace
*Attorney, Agent, or Firm*—Richard G. Geib; Daniel J. Tick; Bernard S. Hoffman

[57] ABSTRACT

A variable area recording geometry is formed over the surface of a photosensitive material by scanning and exposing with an optical writing beam. The width of this area is determined by input signals to be processed. The exposed photorefractive medium results in a phase modulation of an optical beam traversing the medium in a direction parallel to the surface as in an integrated optical waveguide.

20 Claims, 4 Drawing Figures

SIGNAL DEVICE EMPLOYING PHOTOREFRACTIVE AREA MODULATION

BACKGROUND OF THE INVENTION

The present invention relates to coherent optical processing systems in general, and in particular to such systems in which signals to be processed modulate a guided optical beam by means of an integrated optics assembly.

The introduction of an input signal to a coherent optical processing system is typically accomplished by means of an acoustooptical device. Examples of systems employing such devices, commonly known as Bragg cells, are described in U.S. Pat. No. 3,821,548, issued to Jernigan; and in "Multichannel Signal Processing Using Acoustooptic Techniques", by J. N. Lee et al, IEEE Journal of Quantum Electronics, Vol. QE 15, No. 11, November 1979, pp. 1210–1215.

Several drawbacks are inherent in the use of Bragg cells and similar acoustooptical techniques and are well known. Specifically, nonlinearities in the input signal-to-refractive index transfer function restrict the dynamic range of such devices. Other problems include lateral spreading of the acoustic beam in the direction of light propagation, the need for an electrode structure to launch the acoustic signal, frequency dependent attenuation of the propagating acoustic beam and the need for an acoustic absorber to prevent reflections from the waveguide edge.

U.S. Pat. No. 4,263,570, issued to DeFonzo et al is exemplary of various prior art microwave modulators employing area-modulated photoconductive elements. In the DeFonzo et al device, a change in the electrical conductivity of an inner wall in the microwave carrier waveguide alters the boundary conditions presented to the carrier, and as a result makes phase modulation possible for radiation (e.g., microwave, millimeter and submillimeter carriers) whose wavelength is comparable to the physical dimensions of the waveguide cavity. The inner wall of the waveguide is formed from a photoconductive material, and wave modulation in turn is achieved by illuminating the material in response to an input signal, in effect changing a wall boundary condition. The DeFonzo et al device can only form a uniform phase shift or modulation on the microwave beam, in reality a temporal phase change such as a time delay. The beam wavefront cannot be spatially modulated with a variable phase change across the wavefront. In addition, the DeFonzo et al technique is not directly applicable to optical carriers, since wavelengths of infrared, visible, and ultraviolet light are orders of magnitude smaller than the microwave wavelengths.

SUMMARY OF THE INVENTION

A principal object, therefore, of this invention is the provision of an optical modulator which avoids the problems of poor dynamic range, lateral beam spreading, frequency dependent attenuation, etc. associated with acoustooptical devices.

Another object is the provision of an optical modulator wherein a photosensitive material exposed to an optical writing beam is used to control the refractive index of an optical channel with a signal related, variable area.

Yet a further object of the present invention to provide a device in which an optical carrier is phase modulated by means of an optical writing beam.

Still another object of the present invention is to provide a practical device for integrated optical systems.

These and other objects and advantages are realized in brief by placing a suitable photorefractive material in the path of propagation of an optical carrier beam, then modulating the carrier beam with a second optical beam, a writing beam, which illuminates the photorefractive material. Preferably the carrier and writing beams are substantially orthogonal, and the carrier beam is a flat, coherent beam whereas the writing beam may be a pencil-like, focused beam that can be moved over the surface area. The writing beam illuminates an area of the refractive material in response to temporal input signals, one spatial dimension of this area corresponding to the signal amplitude and paralleling the propagation path of the carrier beam, the other orthogonal spatial dimension of the illuminated area corresponding to the time axis of the input signal.

The device of the invention thus encodes optically, and in a novel manner, input signals which vary in time. More specifically, the phase of a laser beam is modulated in an analog manner in a thin film-like structure of an integrated optical device.

BRIEF DESCRIPTION OF THE DRAWINGS

A better understanding of the present invention may be gained by reference to the appended drawings, in which.

DETAILED DESCRIPTION OF PREFERRED EMBODIMENTS

Figure 1:
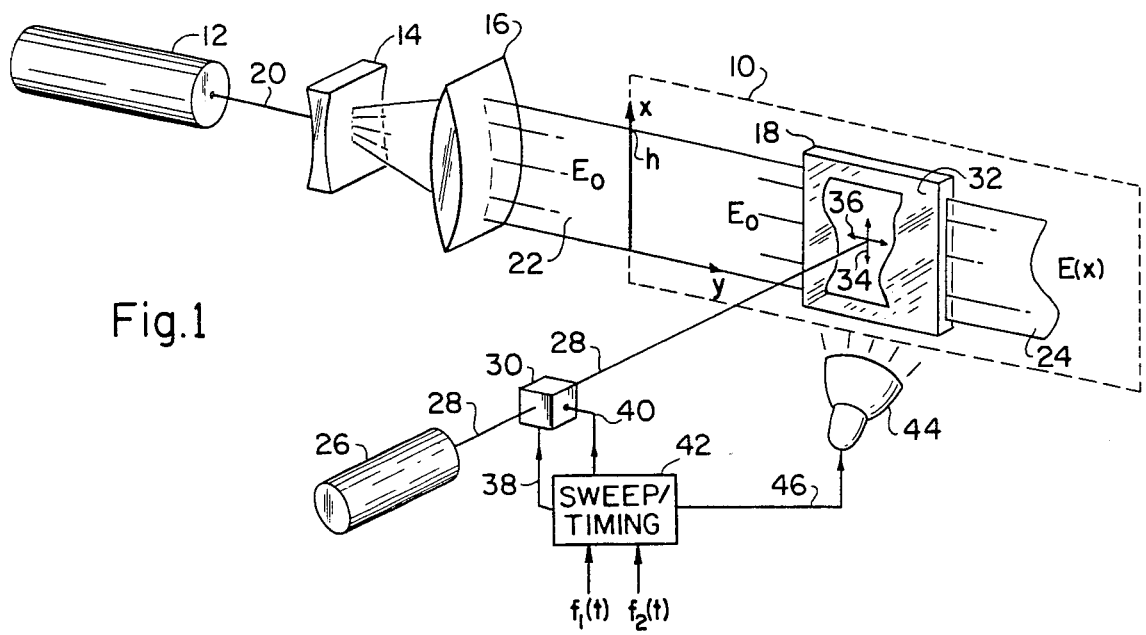
FIG. 1 illustrates one preferred embodiment of the invention in schematic form.

An area modulated recording geometry is illustrated schematically in FIG. 1. An optical carrier source 12, expansion and collimating lenses 14 and 16, and refractive means 18 illuminate an integrated optical channel 10. Source 12 may be any coherent light source such as a laser. Lenses 14 and 16 are arranged to form the beam 20 from source 12 into a narrow, collimated slit-like beam 22 having a uniform amplitude $E_o$ along its cross sectional height h. As shown, h is measured along a first spatial dimension, x, perpendicular to a second spatial dimension, y, which in turn parallels the direction of propagation of the carrier beam. Refractive means 18, formed from a material whose index of refraction changes in response to incident light, is interposed along the path of propagation of carrier beam 22, resulting in a modulated beam 24 characterized by a spatially dependent amplitude $E(x)$.

A second light source 26, which may also be a laser, produces a writing beam 28 which is directed through deflecting means 30. As shown, writing beam 28 is incident upon a surface 32 of refractive means 18 which is substantially parallel to the plane of carrier beam 22, 24 defined by axes x and y. Deflecting means 30 is preferably arranged to deflect beam 28 along substantially perpendicular directions 34 and 36 on surface 32 in response to sweep control signals 38 and 40, respectively, from sweep and timing control circuit 42. Sweep/timing circuit 42 is responsive to two temporal input signals $f_1(t)$ and $f_2(t)$ as explained below. Another preferable feature illustrated in FIG. 1 is the correspondence between writing beam deflection axes 34 and 36 and carrier beam axes x and y. Thus, sweep control signal 38 controls the deflection of beam 28 in a substantially perpendicular direction with respect to the direction of propagation of carrier beam 22, 24, while sweep control signal 40 controls the deflection of beam 28 along a direction substantially paralleling the propagation of the carrier beam.

A diffuse light source 44 is controlled by an erasing signal 46 from sweep/timing circuit 42, and is arranged to illuminate the entire surface 32 of refractive means 18. The choice of material for refractive means 18 may obviate the need for source 44, which need only be included when required for erasing the completed refractive index photoinduced in means 18. As described later in this specification, alternate erasing means may also be used.

Figure 2:
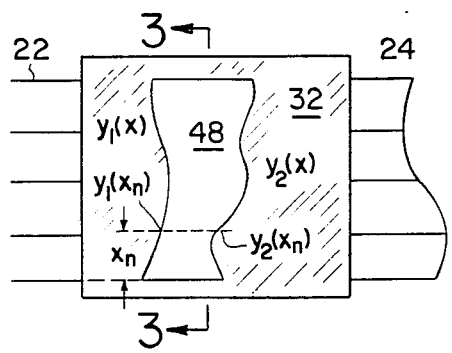
FIG. 2 is a view, on an enlarged scale, of the refractive means of FIG. 1, in greater detail.

Surface 32 of refractive means 18 is shown in greater detail in FIG. 2. Beam 28 is deflected so as to scan an area of incidence 48 on surface 32 bounded in part by curves $y_1(x)$ and $y_2(x)$. It will be noted that points on surface 32 are identified with reference to the carrier beam axes x and y. Thus, for a given displacement $x_n$ along the x spatial dimension, the bounding points of area 48 may be identified, in terms of the y spatial dimension, as $y_1(x_n)$ and $y_2(x_n)$.

The scanning of area 48 by writing beam 28 effects a uniform change in the index of refraction over area 48 with respect to the remainder of surface 32. It is the shape of the area of incidence of the writing beam, then, that determines the spatial intensity function $E(x)$ of the modulated beam 24. More specifically, the change effected by writing beam 28 as a function of the cross sectional dimension x will depend on the change in optical path length, $\Delta L(x)$:

$$\Delta L(x) = \Delta n \, [y_2(x) - y_1(x)] \quad (1)$$

where $\Delta n$ is the difference between the refractive index of the exposed area 48 and the refractive index of the remaining unexposed area of the refractive means. In a preferred embodiment, the spatial bounding functions $y_1(x)$ and $y_2(x)$ defining the exposure area on the refractive means directly correspond to the temporal input functions $f_1(t)$ and $f_2(t)$ applied to the sweep control circuit 42:

$$y_1(x) = a_1 f_1(t) + b_1 \quad (2)$$

$$y_2(x) = a_2 f_2(t) + b_2 \quad (3)$$

$$x = ut \quad (4)$$

where $a_1$ and $a_2$ are scaling constants relating the amplitude of each input signal to the spatial displacement of the associated bounding function; $b_1$ and $b_2$ are biasing constants which ensure that $y_2$ is everywhere greater than $y_1$; and u is a constant representing the speed of the writing beam in the x direction. Appropriate scanning, then, is dependent on the operation of deflection means 30 and, in turn, sweep control means 42.

Mechanical means using mirrors to sweep the writing beam 30 are well known to those versed in the art. Alternately, a CRT trace can be projected line-by-line onto the photorefractive means. For implementation as an integrated optics system, beam deflection without mechanical devices or large projection optics would be practical.

Such deflection means 30 may in practice be implemented as an electrooptic crystal having an optical refractive index which varies in response to an applied electric field. The application of two orthogonal electric fields controlled by electric signals, as at 38 and 40, allows the desired control of the writing beam 28 in two directions as described above.

The temporal input signals $f_1(t)$ and $f_2(t)$ are preferably used by circuit 42 to amplitude modulate a high frequency sweep carrier, and the modulated sweep carrier is used as sweep control signal 42. The frequency of the sweep carrier should be sufficiently high to accurately track the highest frequency present in either input signal. Included in circuit 42 are appropriate amplifiers and dc biases corresponding to the scaling and biasing constants of equations (2) and (3) above. Once scaled and biased, signals $f_1(t)$ and $f_2(t)$ may be used directly to generate upper and lower envelope portions for modulation of the sweep carrier.

Sweep control signal 38 controls the speed of the writing beam in the x direction, as described in equation (4) above, and may be a ramp wave having a slope corresponding to a desired writing speed and duty cycle, which in turn will depend on the cross sectional height h of the carrier beam and a desired repetition rate of optical carrier modulation.

In the embodiment of FIG. 1, erasing signal 46 causes diffuse light source 44 to be turned on after each sweep period defined by signal 38. Selection of an appropriate photorefractive material for refractive means 18 must be coordinated with the choice of light source 44, so that the photoinduced change of refractive index by writing beam 28 is effectively reversed by illumination from source 44. Various photorefractive materials are known which exhibit this desired reversibility.

Figure 3:
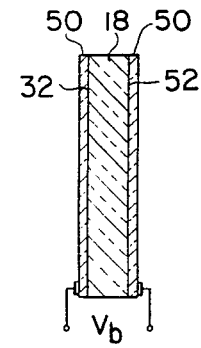
FIG. 3 is a cross-sectional view taken along the lines 3—3 of FIG. 2 and showing the placement of transparent electrodes.

Erasure can also be done with electrical means for materials that have jointly photoconductive and electrooptic properties. Cadmium Sulfide, CdS, is an example of such a material. FIG. 3 shows a cross section of refractive means 18 with alternate erasing means suitable for application with such materials. Transparent electrodes 50 placed on adjacent surfaces 32 and 52 of the photorefractive means 18 are kept at a predetermined voltage $V_b$ during the signal writing portion of the cycle. Electrical charges produced by the photoconductive properties of the material alter the electric field across the transparent electrodes and thereby change the refractive index of the material in the region exposed by the writing beam, by means of the aforementioned electrooptic effect. To erase the refractive index pattern, the voltage across the material 18 is reduced to zero, thereby neutralizing the electrical charge distribution. In turn, the material refractive index reverts to its original value in the absence of any electric field. When the change in refractive index decays to zero, the voltage across electrodes 50 is returned to $V_b$ so that a new area modulated refractive index pattern can be encoded onto the material.

A number of other materials may prove equally suitable for implementing refractive means 18. For example, some commercially available photoresists are potential choices. Experiments conducted on one such photoresist, Kodak KMR 747, are described in "Analysis of a Phase Modulating Recording Mechanism in Negative Photoresist", by Frejlich et al, *Journal of the Optical Society of America*, Vol. 71, No. 7, July 1981, pp 873-878. While an object of Frejlich et al was to provide an irreversible medium, the temperature and ambient light dependent decay observed in KMR 747 may be more pronounced and of sufficient rapidity in other photoresists to make feasible their use in the present invention.

Other suitable photorefractive materials may be found in the larger class of photochromic materials. The refractive index changes that accompany photoinduced absorption changes in photochromic materials have made them a subject of considerable interest as hologram recording media. Data from studies of photochromic materials undertaken to determine their suitability as holographic media, then, may also be used to predict their suitability as a photorefractive element in the present invention.

Another class of materials displaying suitable optical qualities for use in the present invention consists of photorefractive, ferroelectric crystals such as $LiTaO_3$, $LiNbO_3$ and $BaTiO_3$. As indicated in "Optically Induced Change of Refractive Indices in $LiNbO_3$ and $LiTaO_3$," by F. S. Chen, *Journal of Applied Physics*, Vol. 40, No. 3, July 1969 pp. 3389-3396, erasure of an induced index change in such crystals may be effected by heating the exposed sample to 170° C. or by illuminating the sample with a mercury discharge lamp. More recently, high-speed photorefractive switching in the nanosecond range has been reported for $BaTiO_3$.

Figure 4:
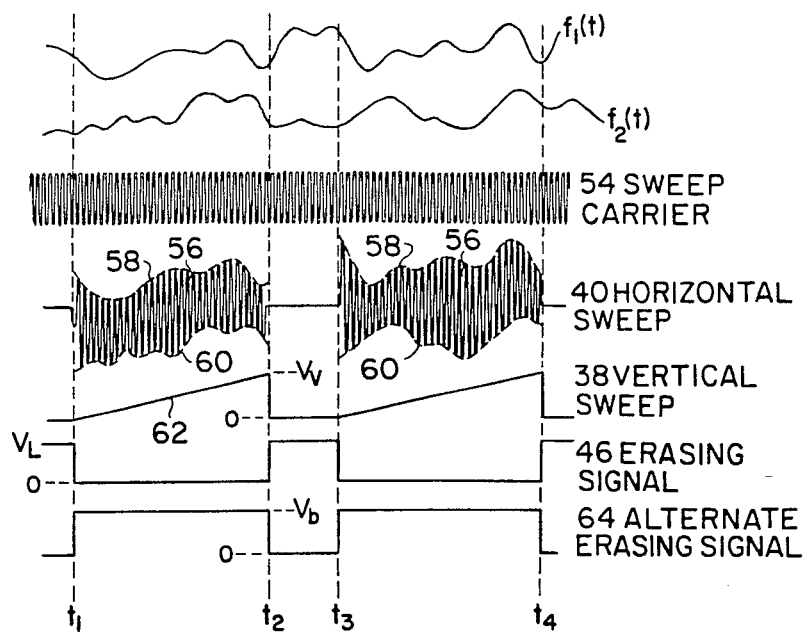
FIG. 4 is a timing diagram illustrative of the operation of the present invention.

Referring to FIG. 4, a timing diagram illustrates the relations among the various signals associated with sweep timing circuit 42.

As shown, signals $f_1(t)$ and $f_2(t)$ are time varying signals, not necessarily related; and the sweep carrier 54, internal to circuit 42, is a sinusoid having a frequency greater than the maximum frequency component of the input signals. The horizontal sweep signal 40 includes amplitude modulated bursts 56 between times $t_1$ and $t_2$, and between times $t_3$ and $t_4$. Preferably, though not necessarily, signal 40 does not vary outside the bursts (e.g., between $t_2$ and $t_3$). Each burst 56 is derived from the sweep carrier 54 and has an upper envelope 58 defined by $f_1(t)$ and a lower envelope 60 defined by $f_2(t)$.

Corresponding to bursts 56 in the horizontal sweep signal 40 are ramps 62 in the vertical sweep signal 38. As shown, each ramp varies between 0 and a value $V_y$ corresponding to the desired vertical deflection of beam 28.

Depending on the polarity of the electrooptic crystal 30, it may be desirable to invert either or both of the sweep control signals in order to preserve the relation between the input signals and modulated beam output 24.

Erasing signal 46, corresponding to the high intensity light source 44 erasing means, is simply a rectangular pulse having a duty cycle defined by the intervals between the bursts 56 in the horizontal sweep, and a maximum value $V_L$ corresponding to the requirements of said light source 4. An alternate erasing signal 64 also is shown for the erasing means of FIG. 3. Signal 64 is also a rectangular pulse; however, it is inverted from signal 46, and its maximum value is the predetermined bias voltage $V_b$ described above.

In practice, certain design restraints on systems embodying the present invention will be suggested by the approximations used to describe the optical phase modulation imposed on beam 24. One such assumption is that one can neglect diffraction of beam 22 within a small region about the exposure area 48. Thus, the entire effect of the induced refractive index change in means 18 may be characterized as an x-dependent optical path length change as indicated in equation (1) above, and beam 24 remains essentially collimated as it leaves the region 48.

From the optical path length $\Delta L(x)$ of equation (1), an expression for $\Delta P(x)$, the optical phase change as a function of x displacement along the optical carrier beam, may be stated:

$$\Delta P(x) = 2\pi/\lambda \cdot n[y_2(x) - y_1(x)] \quad (5)$$

where $\lambda$ is the wavelength of the optical carrier in deriving this result one neglects the constant phase term representing the phase change of the carrier through the unexposed refractive means, (which phase term would appear as a multiplicative factor in the final result). An expression for the modulated beam 24 amplitude $E(x)$ follows from equation (5):

$$E(x) = \exp j(2\pi/\lambda)\Delta n[y_2(x) - y_1(x)] \quad (6)$$

For small phase angles—$\Delta P << 2\pi$—the light output given by equation (6) can be approximated by:

$$E(x) \approx 1 + j(2\pi/\lambda)\Delta n[y_2(x) - y_1(x)] \quad (7)$$

For coherent optical processing systems, the spatial Fourier transform, $F(v)$, of the $E(x)$ light distribution is of interest. From equation (7), disregarding the Fourier spectrum component due to the constant first term, 1:

$$F(v) \approx Y_2(v) - Y_1(v) \quad (8)$$

where $v$ is a spatial frequency variable and $Y_1(v)$ and $Y_2(v)$ are the transforms of the input function $y_1(x)$ and $y_2(x)$. In particular, with $y_1(x) = 0$—that is, for a single input system—$F(v)$, from equation (8), becomes simply proportional to $Y_2(v)$.

It will be appreciated that a number of factors will influence how well the boundary functions $y_1(x)$ and $y_2(x)$ replicate the input signals $f_1(t)$ and $f_2(t)$. Among these factors are the maximum input frequencies present in $f_1(t)$ and $f_2(t)$ for a given application, the writing beam spot size, the frequency of the scan carrier, the size of the exposed area, the photosensitivity of the refractive means, the writing beam intensity, and the photorefractive decay rate. Preferably, the carrier beam is arranged such that it has little or no effect on the refractive index of the refractive means. This may be accomplished by providing refractive means sensitive only to writing beams of a particular optical frequency, orientation or intensity and providing a carrier beam of a different optical frequency, orientation or intensity, (usually a lower intensity). With regard to switching times, a variety of materials have different characteristics. For example, increasing the temperature of the refractive means will allow both faster recording and, as discussed above, faster erasing. Also, increasing the writing beam intensity will lower the required exposure time for many available photorefractive materials.

Various modifications to the above-described embodiment will suggest themselves to those skilled in the art. If moving parts are used, for instance, a variety of alternate deflecting means, such as rotating mirrors and prisms, could be substituted for the electrooptic crystal. Also, as an alternative to the diffuse light source erasing means, the refractive means could be advanced through the optical channel 10 similarly to photographic film in movie cameras. Also, various applications that utilize refractive index means to encode information will suggest themselves to those skilled in the art, (e.g., radar system signal processing).

In view of these and other possible modifications of the preferred embodiment described above, the scope of the present invention is to be measured solely on the basis of the appended claims.

What is claimed is:

1. An optical phase modulator device, comprising
   refractive means interposed along a path of propagation of an optical carrier beam and having an index of refraction which changes in response to incident light; and
   writing means responsive to a temporal input signal for generating a writing beam incident upon the refractive means, said carrier beam having a phase which is modulated in an analog manner in said refractive means, said writing beam having an area of incidence on said refractive means, said area of incidence having a first spatial dimension.

2. The device of claim 1, wherein said area of incidence of said writing beam on said refractive means has a second spatial dimension related to a time period during which the writing means is responsive to the temporal input signal.

3. The device of claim 2, wherein said second spatial dimension of said area of incidence is substantially perpendicular to the path of propagation of said optical carrier beam.

4. The device of claim 1, wherein said first spatial dimension of said area of incidence is substantially parallel to the path of propagation of said optical carrier beam.

5. The device of claim 1, wherein said optical carrier beam comprises a narrow slit-like beam of light.

6. The device of claim 1, wherein said optical carrier beam comprises a narrow slit-like beam of collimated light.

7. The device of claim 1, wherein said optical carrier beam comprises a narrow slit-like beam of coherent light.

8. The device of claim 1, wherein said optical carrier beam comprises a narrow slit-like beam of collimated, coherent light.

9. The device of claim 1, wherein said optical carrier beam comprises a narrow slit-like beam of collimated, coherent, monochromatic light.

10. The device of claim 1, wherein said optical carrier beam comprises a narrow slit-like beam of collimated, coherent light from a monochromatic laser source.

11. The device of claim 10, wherein said area of incidence of said writing beam on said refractive means has a second spatial dimension substantially parallel to a cross-section of said optical carrier beam.

12. The device of claim 11, wherein said second spatial dimension of said area of incidence is related to a time period during which the writing means is responsive to the temporal input signal.

13. The device of claim 1, wherein said refractive means comprises a thin film of material exhibiting electrooptic and photorefractive properties.

14. The device of claim 13, wherein said thin film further exhibits photoconductive properties.

15. The device of claim 14, further comprising means for applying an electric field across the thin film.

16. The device of claim 1, wherein said refractive means comprises a film of photochromic material.

17. The device of claim 1, further comprising erasing means for reversing changes in the index of refraction of said refractive means effected by said writing beam.

18. The device of claim 17, wherein said erasing means comprises a high intensity light source arranged to illuminate said refractive means.

19. The device of claim 17, wherein said erasing means comprises an infrared light source arranged to illuminate said refractive means.

20. The device of claim 17, wherein said erasing means comprises a pair of transparent electrodes placed on adjacent sides of said refractive means.

* * * * *

UNITED STATES PATENT AND TRADEMARK OFFICE
CERTIFICATE OF CORRECTION

PATENT NO. : 4,544,898
DATED : October 1, 1985
INVENTOR(S) : BENJAMIN J. PERNICK It is certified that error appears in the above-identified patent and that said Letters Patent are hereby corrected as shown below:

Col. 2, line 37, after "view" insert a comma
line 38, after "3-3" insert a comma Col. 3, line 46, start a new paragraph with "In"
line 56, align equation (4) with equations (2) and (3)

Col. 5, line 26, after "1969" insert a comma
line 61, delete "4"

Col. 6, line 14,, change equation (5) to

-- $\Delta P(x) = 2\pi/\lambda \cdot \Delta n[y_2(x) - y_1(x)]$ -- line 16, change "in" to -- . In --

Signed and Sealed this

Fourth Day of November, 1986

[SEAL]

*Attest:*

DONALD J. QUIGG

*Attesting Officer*  *Commissioner of Patents and Trademarks*